July 1, 1924.　　　　　E. P. ELZEY　　　1,499,974
EMERGENCY TRACTION OR ANTISKID CHAIN
Filed March 20, 1923
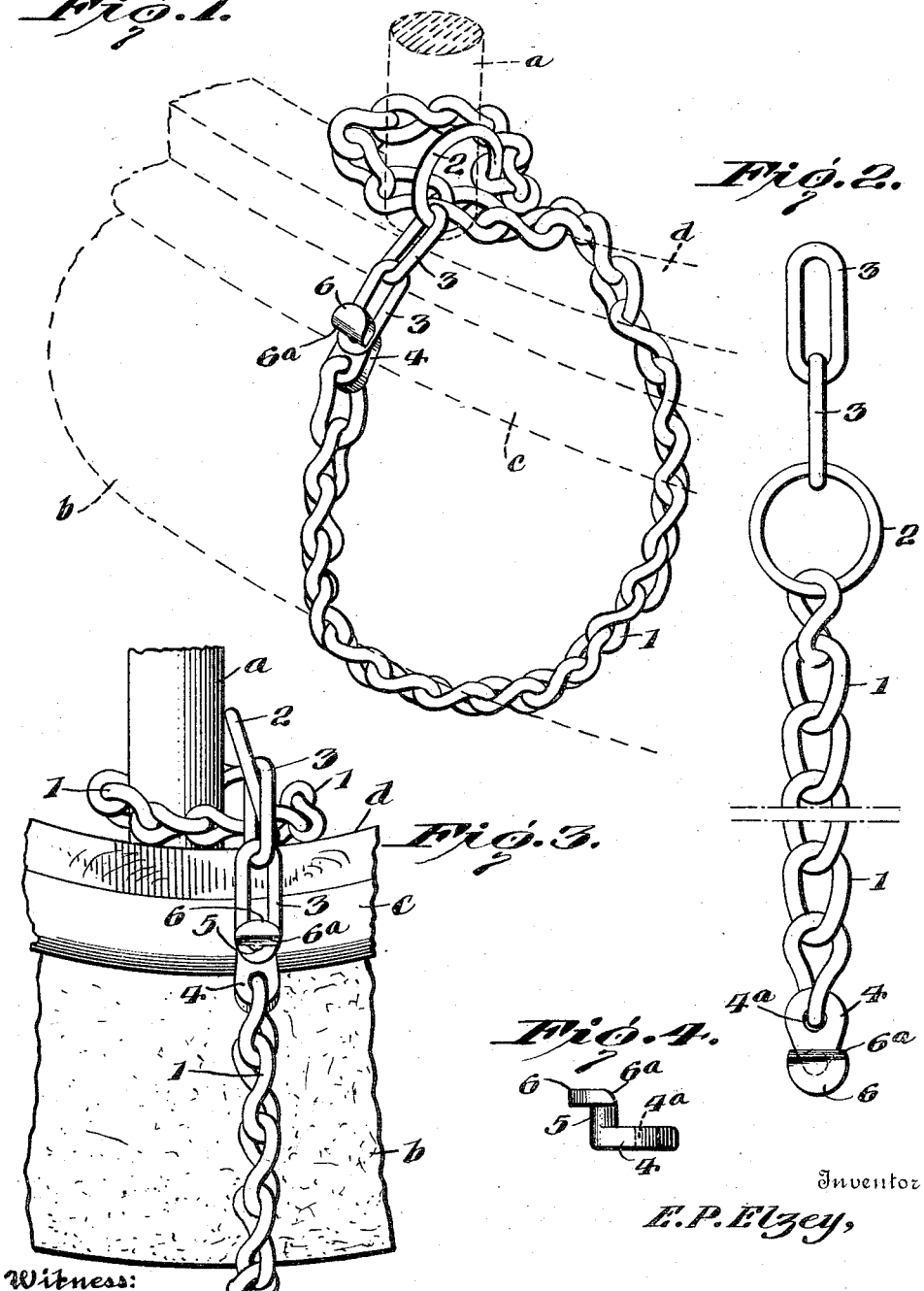
Inventor
E. P. Elzey, Patented July 1, 1924.

1,499,974

UNITED STATES PATENT OFFICE.

EDGAR P. ELZEY, OF PARKERSBURG, WEST VIRGINIA.

EMERGENCY TRACTION OR ANTISKID CHAIN.

Application filed March 20, 1923. Serial No. 626,325.

*To all whom it may concern:*

Be it known that I, EDGAR P. ELZEY, a citizen of the United States of America, and resident of Parkersburg, Wood County, West Virginia, have invented certain new and useful Improvements in and Relating to Emergency Traction or Antiskid Chains, of which the following is a specification.

The traction chain of my invention is of the single chain length type intended for emergency use and quick and easy application to and removal from the vehicle wheel; and the objects and nature of the invention will be readily understood by those skilled in the art in the light of the following explanation of the accompanying drawings illustrating what I now believe to be the preferred mechanical expression or embodiment of the invention from among other forms, constructions and arrangements within the spirit and scope thereof.

An object of the invention is to provide an improved anti-skid or traction device more particularly intended for emergency uses and quick and easy application to and removal from vehicle wheels, that embodies a single length of chain at one end having one or more links formed to detachably receive a coupling and locking element permanently secured to the other end of the chain length, and embodying an open link or ring whereby the chain can be anchored to a spoke to receive the pull and strain of traction and to prevent longitudinal creeping of the chain transversely of the tire.

With this and other objects in view my invention consists in certain novel features in construction and in combinations and arrangements as more fully and particularly set forth and specified hereinafter.

Referring to the accompanying drawings:—

Fig. 1 is a perspective view showing the chain of my invention extending around a tire and wheel rim and anchored to a spoke, the tire and wheel rim and spokes being shown by dotted lines.

Fig. 2 is a detail on elevation of chain length straightened out.

Fig. 3 shows a portion of a wheel and tire in side elevation showing my chain anchored thereto in operative position.

Fig. 4 is a detail detached edge view of the coupling and locking element.

The anti-skid or traction device illustrated consists of a single length of chain composed of a succession of permanently connected links at one end having directly and permanently attached thereto a coupling and locking element adapted to one or more of the opposite end links of the chain length.

The chain is of a length to loop around a wheel spoke $a$, and from thence pass in opposite directions across the inner surface of the wheel and around the wheel tire $b$ so as to traverse the tread thereof. The chain thus completely encircles the tire and wheel rim $c$, and felloe $d$, and is anchored to the spoke.

The anti-skid device throughout the major portion of its length is composed of a section of traction chain 1, preferably a traction chain of commerce such as twisted link machine chain made up of strong permanently united welded links. In fact, the traction device, is composed of traction chain except for the coupling and locking element, an enlarged open loop, ring or link 2, and one or more elongated open and coupling links 3.

The enlarged rigid annulus or loop 2 is permanently and directly coupled into one end of the section of traction chain 1, in direct longitudinal continuation thereof, and the strong rigid flat open elongated links 3 are directly and permanently coupled together and to the loop 2 so as to constitute with loop 2 a longitudinal continuation of the traction chain. In this instance, I show two similar flat end coupling links 3, but one or more end coupling links 3 can be employed any one of which is formed to receive and cooperate with the coupling and locking member to secured the chain ends together to confine the chain to the wheel and tire.

The coupling and locking member consists of a one-piece strong rigid element permanently, and loosely coupled into the chain in longitudinal continuation thereof to form an end link-like element thereof, capable of buttoning into and interlocking with either one of the opposite end links 3 to couple the chain ends together against accidental separation.

In the particular example illustrated, this one-piece unit coupling member embodies a flat link or longitudinal base portion 4 that at one end loosely receives the end link of the traction chain section 1 and is thereby permanently and directly coupled into said chain. The opposite or outer end of this base or link member 4 is formed with a central strong rigid lateral or upstanding stud 5 formed with a forwardly and laterally projecting head or button 6 preferably formed with an upwardly and forwardly beveled transverse straight rear edge 6ª, approximately flush with the vertical longitudinal rear edge of the stud 5. The base link 4 is open at 4ª, for the passage of the welded or other permanently closed end link of the traction chain 1, so that the link 4 is loosely and permanently interlocked therewith.

The coupling member 4—5—6 is adapted to button to or into either of the links 3, or into the link 3 if only one such link is employed, and to as readily unbotton therefrom. The link 3 and said member can be coupled together, or uncoupled and separated, by tilting the link or member on the side bar of the link under head 6 as an axis, when the link and member are arranged at right angles to each other with the head or its stud 5 located about midway the length of the link. In coupling, when the link and member are thus arranged, and relatively tilted, the head or button 6 enters front edge forwardly into the link opening between the link side bars with its rear beveled edge 6ª parallel with said bars, and then the links and member are relatively tilted on the link bar under the front of the head so that the other link bar moves past beveled edge 6ª into engagement with the top or outer face of the base link 4, thereupon relative lateral swing of the link and member will bring the same into longitudinal alinement with its parts locked together loosely, against accidental separation even when the chain is hanging and swinging more or less loosely and is not under longitudinal pull or tension.

To uncouple and separate the chain ends, the base link and the link 3 are caused to longitudinally move together one over the other and are brought into position at right angles so that the button or head can be tilted out of link 3, as before described.

The stud 5 is preferably rounded and of a radius to snugly fit and take bearing in the rounded end of the link 3, and the transverse over all length of the head or button 6 is preferably at least equal to the outer side or over all transverse width of the link 3 and less than the center opening of said link that is not occupied by the adjoining chain link extending therethrough, and the length of the stud 5 is but slightly greater than the thickness of link 3.

The base link can be variously formed and I do not wish to limit all features of my invention to any particular formation thereof for permanently and directly coupling the headed stud or button to and in the chain length, although, as at present advised by experience, I find a flat base link to be of advantage in that it can be held or maintained in more or less flat position beside the wheel rim or felloe or beside the inner part of the tire, and to thus hold the link 3 that is coupled thereto.

In applying the anti-skid device to a vehicle wheel, the chain length is passed through the wheel between the spokes, and the enlarged loop or ring 2 is held at an inner side face of a spoke with the link or links 3 at the outer side of the wheel. The chain is then passed around the spoke and its opposite end is threaded through the ring 2 and carried through the wheel to the inner side face thereof and then passed from that side around the tire so as to traverse the tire tread and inwardly at the outer side face of the tire to the link 3 at the outer side of the wheel. The chain is then pulled taut to afford sufficient slack to enable the operator to secure the chain ends together by buttoning the coupling member into the link 3 that will secure the chain with the desired fit or tension on the tire.

When thus secured on the wheel and tire, the enlarged loop or ring 2 through which the chain is threaded receives the pull of the chain under traction from both side faces of the wheel and maintains the chain anchored to the spoke and also performs the important function of holding the chain against longitudinal creeping transversely of the tire and maintains the coupling member in the desired position at the side face of the tire or wheel and away from the tire tread or other point where it might become injured or distorted by contact with the road surface, curbs, or the other obstructions.

Furthermore the enlarged loop or ring 2 serves as a guide or indicator for the proper location of the link or links 3 and other parts in the application of the chain to a wheel.

This anti-skid device is as quick and easy of removal, as in application to a wheel, as will be readily understood in view of the forgoing description in the light of the drawings.

It is evident that various changes, modifications, and variations might be resorted to without departing from the spirit and scope of my invention and hence I do not wish to limit my invention to the exact disclosures hereof.

What I claim is:—

1. An anti-skid or traction device consisting of a single chain length at one end provided with a coupling member in longitudinal continuation thereof, an enlarged loop directly coupled into the other end of said chain length, and a coupling link directly coupled into said loop to receive said member in securing the chain ends together.

2. A length of traction chain at one end having a coupling member loosely coupled thereinto, and at the other end having a loop coupled thereinto and formed to have the member and chain threaded therethrough, and an elongated link loosely coupled directly into said loop and formed to cooperate with said member in detachably coupling together the chain ends.

3. A length of traction chain having a coupling member forming one end thereof and a loop and elongated open flat link forming the other end thereof, said loop formed and arranged to permit passage of the member and chain therethrough, said member and link relatively formed to cooperate in detachably coupling together the chain ends.

4. A traction chain including as direct permanent elements thereof, an end elongated loop-like link, and an end coupling member embodying a link portion formed with an upstanding stud having a forwardly projecting transversely elongated head, with a beveled straight rear edge, formed to button through and unbutton from said link by relative tilting movement when the link and coupling member are arranged at right angles with the head about midway the length of the link.

5. A traction chain including as directly and loosely coupled permanent end elements thereof, an end coupling member forming a link portion having an end headed stud, an end ring through which the chain end having the member is adapted to be threaded after being passed around a wheel spoke, and a free link coupled into said ring and formed to detachably receive said headed stud for coupling and uncoupling the chain ends.

Signed at Parkersburg, Wood County, State of West Virginia, this 17th day of March, 1923.

EDGAR P. ELZEY.